T. K. SMITH.
APPARATUS FOR SEPARATING GASES AND VAPORS FROM LIQUIDS.
APPLICATION FILED JAN. 4, 1919.

1,350,576.

Patented Aug. 24, 1920.
4 SHEETS—SHEET 1.

Witness:
John Endere
Frederick F. Mason

Inventor
Thomas K. Smith
by Wallace R. Lane
Atty.

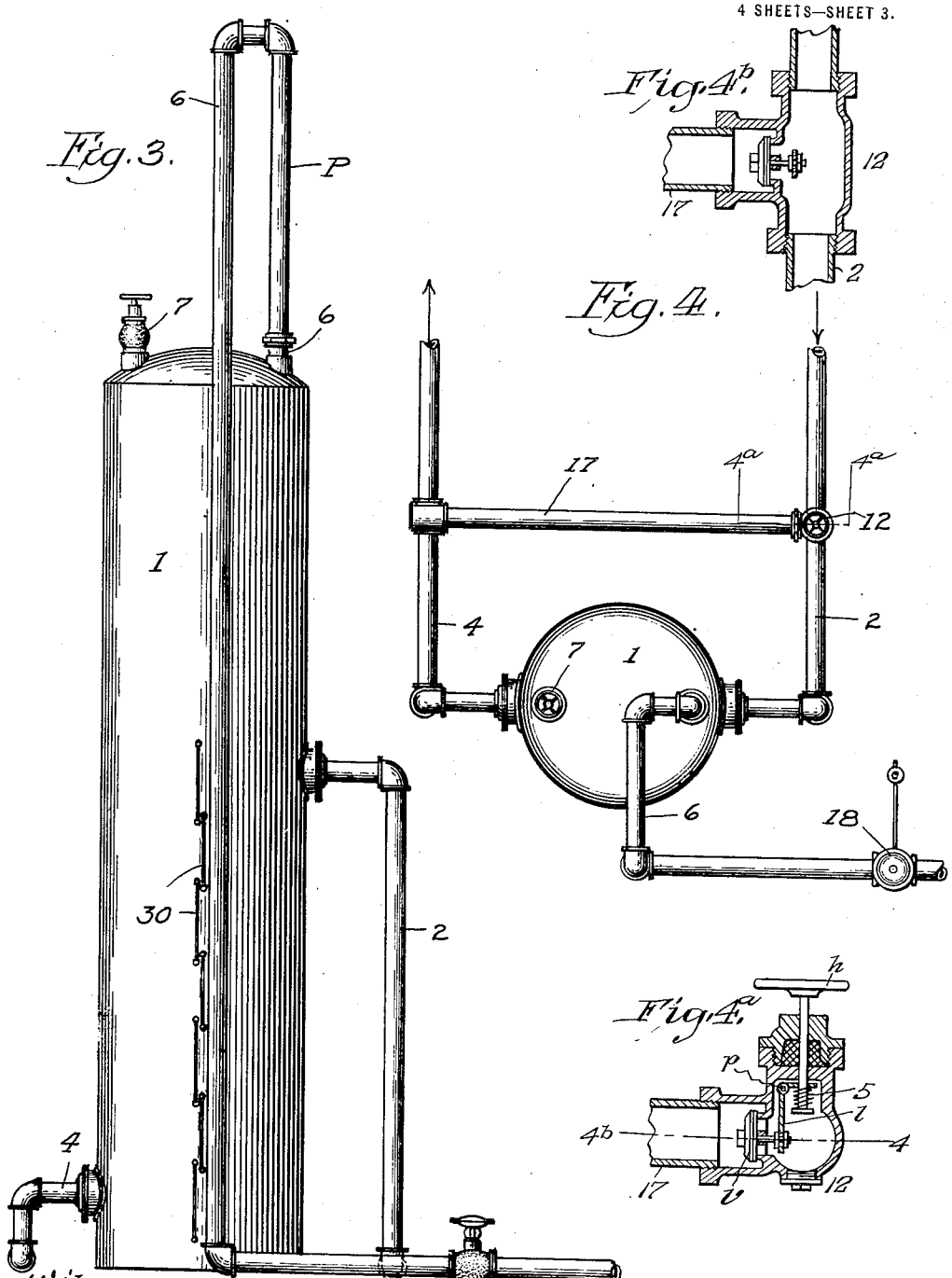

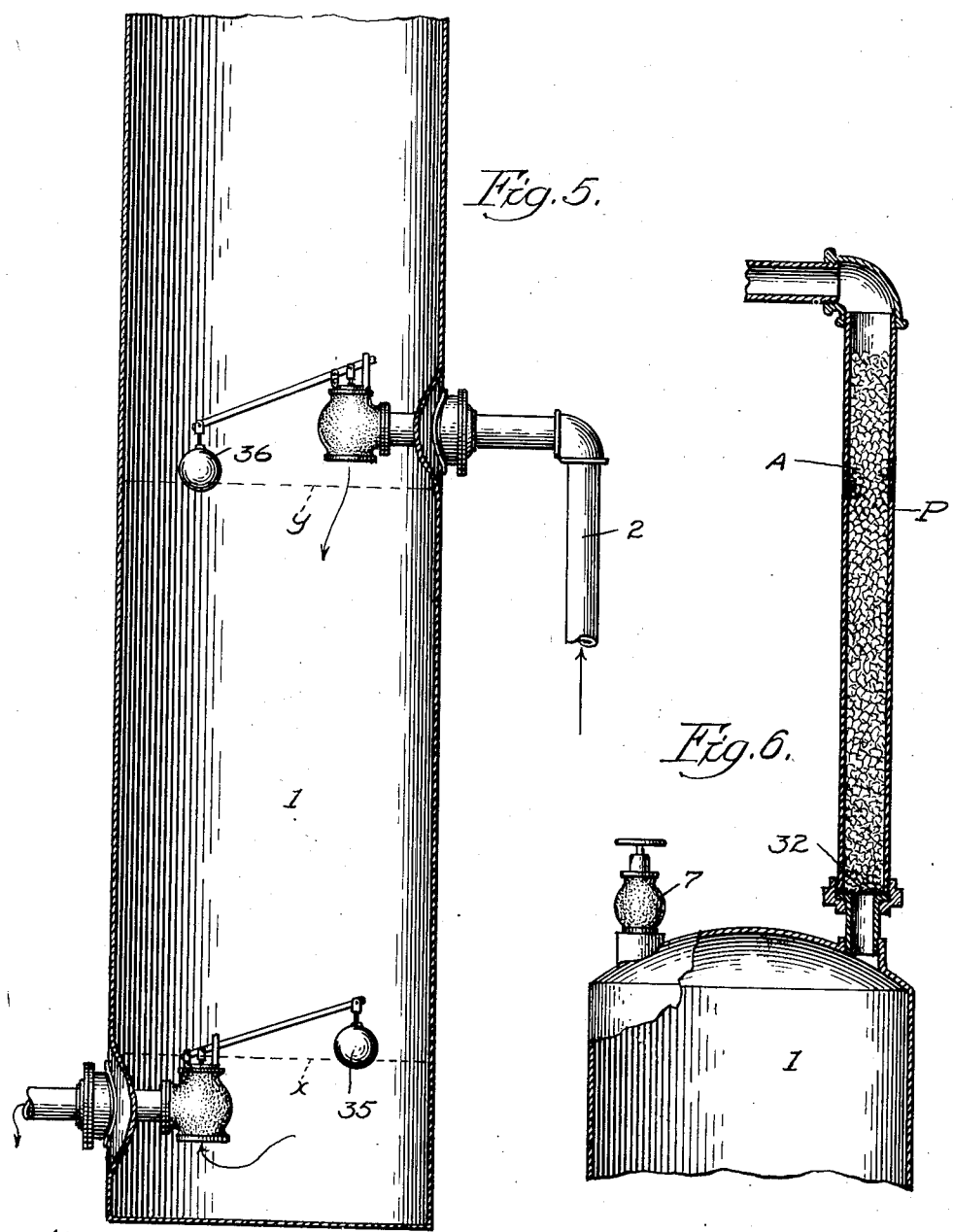

UNITED STATES PATENT OFFICE.

THOMAS K. SMITH, OF TULSA, OKLAHOMA.

APPARATUS FOR SEPARATING GASES AND VAPORS FROM LIQUIDS.

1,350,576.  Specification of Letters Patent.  Patented Aug. 24, 1920.

Application filed January 4, 1919. Serial No. 269,565.

*To all whom it may concern:*

Be it known that I, THOMAS K. SMITH, a citizen of the United States, residing at Tulsa, in the county of Tulsa and State of Oklahoma, have invented certain new and useful Improvements in Apparatus for Separating Gases and Vapors from Liquids, of which the following is the specification.

This invention relates to means for effecting a quick and easy separation of gases and vapors from liquids, and is especially adapted for utilization in separating casing-head or other gases and vapors from the liquid oil as they flow or are pumped from oil wells.

It is to be understood that this invention is capable of application in the separation of substantially any gases and vapors from any liquids with which they may be associated, however it will be described herein in connection with the separation of gases and vapors from liquid oil as they together flow or are pumped from oil wells, since therein lies its greatest usefulness as now contemplated.

Hereinafter throughout the specification and claims the term gas is to be understood as referring to gas, vapor, or air, or combinations of two or more thereof.

In the production of oils from oil wells the oil when either flowing under rock pressure or being pumped is accompanied by large quantities of gas commonly called flow or casing-head gas. This gas is rich in valuable constituents and heretofore has been lost by escape into the air due to the inability to and lack of proper apparatus for handling it. Any apparatus to successfully handle this gas which is produced in especially large quantities when wells of large volume are first drilled in must be automatic in operation in order to accommodate the wide fluctuation in pressures without the occurrence of an explosion, and other dangers. Such an apparatus is provided by the present invention and as a result of which the gases and oil may be effectively and easily separated in the field or elsewhere, the gas being separately conducted away for further treatment to recover the valuable constituents, or stored or used for heat production or other purposes as desired, and the liquid oil conducted away in a steady flow for further treatment, use or storage.

Among the objects of this invention therefore is to render possible the effective separation of gases from such liquids as they may be associated with; further to provide an apparatus for accomplishing such results in an automatic manner, and especially adapted for the separation of casing-head gas from crude oil right in the oil field; further to accomplish these results where the gases and liquids are produced together in large volumes and under great pressure; further to eliminate the dangers of explosions and fire in the oil industry; further to cause the liquids and freed gases to separately flow off in a quiet manner; further to save the heretofore big losses in casing-head gas; further to provide a more simple, economical, and efficacious apparatus of the class described; and such further objects, advantages and capabilities as will later more fully appear.

My invention further resides in the combination, construction and arrangement of parts illustrated in the accompanying drawings, and while I have shown therein a preferred embodiment I desire it to be understood that the same is susceptible of modification and change without departing from the spirit of my invention.

In the drawings:—

Fig. 3 is a view similar to Fig. 1, but showing a modification.

Fig. 4 is a plan view of Fig. 3.

Figure 1:
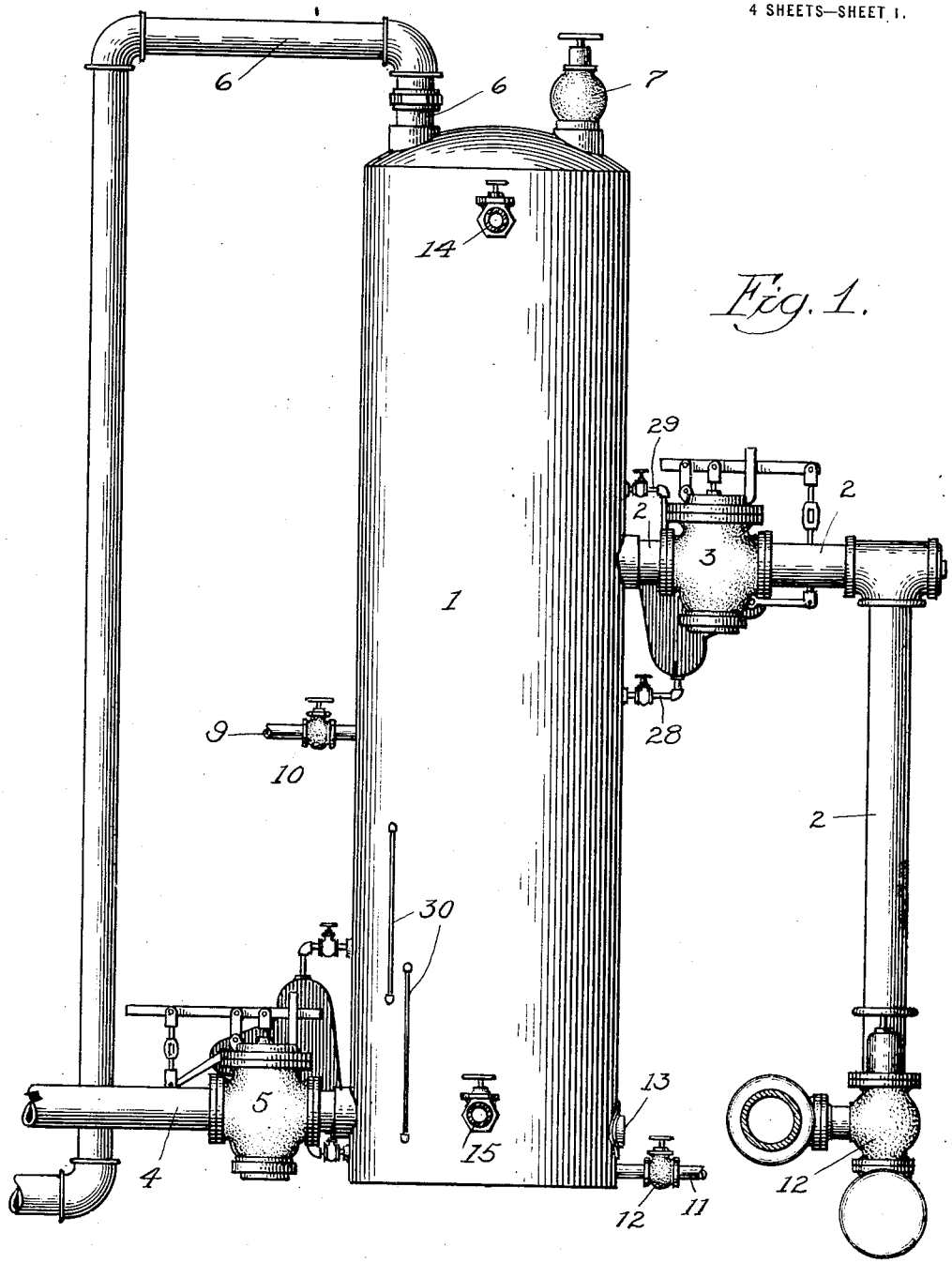
Figure 1 shows a side elevation of a separator embodying my invention.

Fig. 4ᵃ is a vertical transverse sectional view on the line 4ᵃ—4ᵃ of Fig. 4, and showing the details of the automatic by-pass valve 12.

Fig. 4ᵇ is a horizontal transverse section on the line 4ᵇ—4ᵇ of Fig. 4ᵃ.

Fig. 5 is a fragmentary sectional view through a separator, and showing a modified form of valve control.

Fig. 6 is a sectional view through the upper portion of the tank, and gas outlet pipe of Fig. 3.

Referring to the drawings, the apparatus utilized for carrying out my improved method comprises a tank 1, about midway of the height of which enters the inlet pipe 2, provided with the valve 3 hereinafter to be described. Adjacent the bottom of the tank 1, is positioned the liquid outlet pipe 4, provided with the valve 5, later to be described. Leading from the top of the tank 1, is the gas outlet pipe 6, and opposite thereto the relief valve 7.

Figure 2:
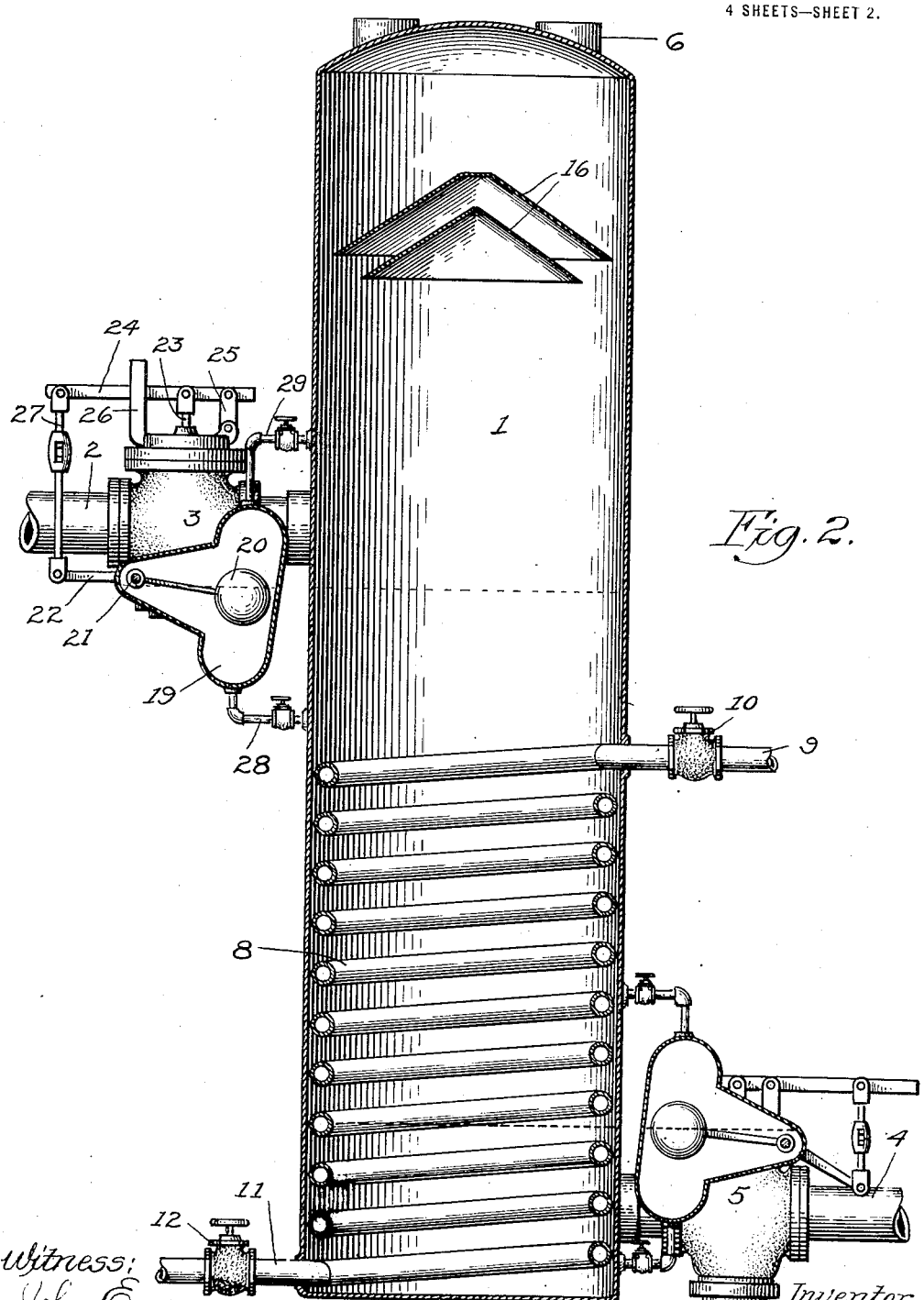
Fig. 2 is a view similar to Fig. 1, but showing the tank and part of the valves in sectional view.

As shown in Fig. 2 the form of tank or separator illustrated in Fig. 1 is provided around the inner circumference of its lower portion with a coil of pipes 8, having the inlet pipe 9, provided with a suitable valve 10, and the outlet pipe 11, provided with a suitable valve 12. As shown in Fig. 1 the tank is also provided adjacent its lower end with the closure 13 (which may be a handhole plate or other suitable closure). The tank is also provided adjacent its upper and lower ends in the side portions with the inlet 14 and outlet 15, each provided with suitable valves or other means of closure.

There may be also positioned within the tank or separator, if desired, suitable baffle plates 16. As seen in Fig. 4 a by-pass 17 connects the inlet pipe 2 with the liquid outlet pipe 4, and at the juncture of this by-pass 17 with the inlet pipe 2 is provided a relief valve 12. The relief valve 12 may be of any suitable type, such that it will operate to automatically hold the by-pass 17 closed as long as the inlet into the expansion chamber of tank 1 is open, and to automatically open and establish communication with by-pass 17 when the automatic valve controlling the inlet into the expansion chamber is closed. As illustrated in Figs. 4$^a$ and 4$^b$, the valve $v$ is held against its seat by coil spring $s$, acting in an obvious manner against one leg of the lever arm $l$, pivoted at $p$. The tension of spring $s$ may be regulated by rotation of handle $h$. When the inlet into the expansion chamber closes, pressure will build up in inlet pipe 2 to such degree that it will open the valve $v$ against tension of spring $s$. As soon as the inlet valve into the expansion chamber is again opened, the pressure in inlet pipe 2 will be relieved and valve $v$ in valve 12 will be brought to its seat by spring $s$ to close by-pass 17. As also shown in Fig. 4, the gas outlet pipe 6 is provided with a suitable back-pressure regulator 18.

Referring to Figs. 1, 2 and 4, the mixed liquids and gases flowing from the casing-head of the oil well will enter the tank 1, through the inlet pipe 2, and will thereupon expand to fill the tank 1, and the liquids being of greater specific gravity will fall to the bottom of the tank or separator, while the gases will rise as a result of their buoyancy to the upper regions of the separator. The liquids collected in the bottom of the tank will be conducted away to a suitable storage tank through the pipe 4, while the gases will pass into the pipe 6, and be conveyed to any desirable place for further treatment, to recover their valuable constituents, or for consumption for heating purposes, or otherwise used as desired. In order to render the action of the tank completely automatic, I have provided automatic means in connection with the valves 3 and 5, which I will now describe. Considering first the valve 3, see Figs. 1 and 2, it will be seen that situated at the side of of the valve is the hollow chamber 19, within which is mounted the float valve 20. This float valve is pivoted at 21, and outside of the chamber 19 extends the arm 22, which is rigidly connected with the float valve in order to have synchronous movement therewith. Extending through the top of the valve 3 is the usual valve stem 23 pivoted to the arm 24, which in turn is pivotally connected to the valve through the medium of the link 25. The arm 24 is permitted free up and down movement through a slot (not shown) in the upright arm 26. The free end of the arm 24 is connected with the arm 22 by means of the rod 27, whereby any motion of the arm 22 will be communicated through the arm 24 to open or close the valve. The chamber 19 is in communication with the interior of the tank 1 by means of the pipes 28 and 29, respectively, each of which pipes are provided with a suitable valve as shown. When the liquid within the tank rises above the pipe 28, it will flow therethrough into the chamber 19, and when it rises to a height sufficiently to elevate the float valve 20, the valve stem 23 will be lowered in an obvious manner, and the valve accordingly automatically closed, and remain closed until such time as the liquid level in the tank falls.

The construction of valve 5 is similar to that just described for valve 3, except that in the former, a rise of the liquid level will open the valve and a fall of the liquid level will close the same; valve 5 in this respect being just the reverse of valve 3.

From this it will be seen that when the liquid in the tank has substantially all passed out through the pipe 4, that the valve 5 will automatically close. When, however, the liquid collects in the tank to a height to operate the float valve of valve 5, it will be opened and remain open as long as the liquid is at a sufficient height to cause upward movement of the float valve. It will thus be seen that the tank is automatic in its operation, and should a gush of oil and gas suddenly enter the tank from the well it will be amply taken care of, since as described above, as soon as the liquid rises to a height sufficiently to operate the float valve 20 of valve 3, the inflow of gas and liquid will be cut off and prevent a rise of the liquid up to the gas outlet, or the establishment of a pressure within the tank sufficiently to burst the same. The separation of the liquid from the gas is further facilitated by the gases being hampered in their upward movement by the baffles 16.

Should the deposit of black sediment or the like within the tank become so great as to be detrimental, or be desired to be removed for other reasons, steam may be passed through the coils 8, and the black sediment or other deposited matter heated and converted into liquid form to pass out the outlet 4. These steam pipes may also if desired be used for otherwise treating any desired contents of the tank or separator. Also if desired steam may be passed within the tank through the openings 14 or 15 to treat the contents of the tank as desired. These openings may also be used to inject any desired chemicals within the tanks, if such be desired.

The relief valve 7 shown in Figs. 1, 3, 4 and 6 will operate to relieve any excess pressure within the tank 1, and thus eliminate any danger of explosion by a sudden building up of pressure from any means whatever. This building up of pressure within the tank will also be further eliminated by the back-pressure regulator 18. It is also to be observed that when the combined liquid and gas is automatically cut off by the float valve 20 from entering the tank, it will pass through the by-pass 17, which it will be permitted to enter by the relief valve 12, which relief valve, however, in normal operation will prevent passage of the gas and oils into this by-pass. It is obvious that the by-pass 17 may connect either with the outlet pipe 4, or be conducted to any other suitable storage means. As shown in Figs. 1 and 3, suitable observation glasses may be located within the sides of the tank, whereby to observe the height of the liquid therein.

Referring to Figs. 3 and 6 it will be seen that I may if desired provide a modified arrangement of gas outlet, in which the primary branch P of the outlet pipe is of considerable height, and whereby it may be filled or partially filled with more or less coarse particles A, such as steel shavings, rocks or stones of suitable size, or the like, which particles are supported from downward movement by the screen 32. By this arrangement the outflowing gases may pass upwardly through the screen and interstices between the particles, during which movement any liquids that may be entrained with these gases will be caught by the coarse particles, and caused to percolate down therethrough and back into the tank or separator 1, thus serving to further effectively separate the liquids from the gases.

In Fig. 5 I have illustrated a different arrangement of valves for effecting the automatic action of this separator, and in which figure the valves are placed within the tank instead of outside as illustrated in Figs. 1 and 2. The operation of the valves in Fig. 5 is quite similar to that in Figs. 1 and 2, the lower valve being held open when the liquid rises to a level sufficient to elevate the float 35, it being illustrated as floating at the liquid level indicated by the dotted line $x$, which holds the valve completely open in an obvious manner. Should the liquid elevation fall below the line $x$, the float 35 will fall therewith until the valve is closed and the outflow of liquid prevented.

The operation of the valve controlling the inlet pipe 2 is similar to that of the lower valve just described, except that it operates in a reverse manner, that is to hold the valve open when the float 36 is at its lowest position, and to close the valve when the float is at its highest position, the positions just referred to being effected by the rise of the liquid in the tank to these points. The dotted line $y$ illustrates the liquid as having risen to a point to just commence lifting of the float 36, the inlet valve, however, still being wide open. In this figure the operation of the gas outlet is similar to that described in connection with Figs. 1 and 2, and hence will be omitted for brevity.

It is, of course, understood that any suitable arrangement of piping may be employed for the inlet 2, the essential requirement being the provision of a by-pass, whereby when the inlet pipe has been automatically cut off from the tank, the incoming liquids and gases may be diverted through such by-pass to any suitable place of storage.

While I have illustrated the inlet pipe 2 as connecting with the tank at a point substantially midway of its height, it will be understood that the particular height at which this connection is made will be varied to suit the requirements as desired. I have, however, found that with this inlet pipe positioned as shown, very excellent results have been obtained. Also while I have illustrated a vertical tank, it is to be understood that this invention is also applicable to a tank arranged in a horizontal position if such be desired, and as understood from the foregoing specification the automatically operated valves can be positioned either inside or outside of the tank.

Should any substantial amount of water be present with the oil in the tank, such water may be drained off from beneath the oil by removing the closure 13. Also any bottom settlings or chemicals which might be used in the treating of the liquids may be drained off by removing this closure, or by removal through the opening 15, as desired.

The back-flow regulator 18 shown in Fig. 4 will prevent any pressure which might be created suddenly or otherwise in the gas storage from being transmitted back into the tank or separator 1.

It will thus be seen that I have provided an exceedingly efficient and self-contained device for separating gases from liquids, and one which is completely automatic in its operation, and it is in this automatic feature that the greatest advantages of the device may be brought to the benefit of the user, and make it possible to separate in any quantity and volume the gases from the liquid, thereby making it practical to pipe gases any distance and at any pressure, according to the conditions of the source of supply of the combined liquid and vapor. This device will operate under any pressure or vacuum according to the conditions requiring same. It can be used further to automatically control the loading of tank cars or tanks of any kind, and to prevent the over-flowing of said tank car or vessel.

Having now described my invention, I claim:

1. In apparatus for separating gases or vapors from liquid oil, a tank constituting a liquid container and a gas expansion chamber, an inlet leading directly into said expansion chamber, at a point intermediate the top and bottom portions of said tank to permit the joint inflow directly into said expansion chamber of associated gases and liquid, and the gases to expand and rise and the liquid to settle therefrom, and means automatically controlled by the elevation of the liquid in said tank for stopping the inflow of said associated gases and liquid thereinto.

2. In apparatus for separating gases or vapors from liquid oil, a tank constituting a liquid container and a gas expansion chamber, an inlet leading directly into said expansion chamber, at a point intermediate the top and bottom portions of said tank to permit the joint inflow directly into said expansion chamber of associated gases and liquid, and the gases to expand and rise and the liquid to settle therefrom, and means automatically controlled by the elevation of the liquid in said tank for stopping the inflow of said associated gases and liquid thereinto, a liquid outlet in the liquid container, and automatic means controlling the liquid outlet operable to automatically close the outlet when the liquid falls below a predetermined level.

3. In apparatus for separating gases or vapors from liquid oil, a tank constituting a liquid container and a gas expansion chamber, an inlet leading directly into said expansion chamber, at a point intermediate the top and bottom portions of said tank to permit the joint inflow directly into said expansion chamber of associated gases and liquid, and the gases to expand and rise and the liquid to settle therefrom, and means automatically controlled by the elevation of the liquid in said tank for stopping the inflow of said associated gases and liquid thereinto, an inlet pipe leading to said inlet, a by-pass connected with said inlet pipe, and automatic means permitting flow of associated gases and liquid through the by-pass when the inlet is automatically closed, but preventing such flow through the by-pass when the inlet is open into the expansion chamber.

4. In apparatus for separating gases or vapors from liquid oil, a tank constituting a liquid container and a gas expansion chamber, an inlet leading directly into said expansion chamber, at a point intermediate the top and bottom portions of said tank to permit the joint inflow directly into said expansion chamber of associated gases and liquid, and the gases to expand and rise and the liquid to settle therefrom, and means automatically controlled by the elevation of the liquid in said tank for stopping the inflow of said associated gases and liquid thereinto, a liquid outlet in the liquid container, and automatic means controlling the liquid outlet operable to automatically close the outlet when the liquid falls below a predetermined level, an inlet pipe for the inlet, an outlet pipe for the outlet, a by-pass connecting said inlet pipe with said outlet pipe outside of said tank, and means automatically permitting flow of incoming gases and liquid through said by-pass when the inlet is automatically closed, but preventing such flow through the by-pass when the inlet is open into the expansion chamber.

5. In apparatus for separating gases or vapors from liquid oil, a tank constituting a liquid container and a gas expansion chamber, an inlet leading directly into said expansion chamber, at a point intermediate the top and bottom portions of said tank to permit the joint inflow directly into said expansion chamber of associated gases and liquid, and the gases to expand and rise and the liquid to settle therefrom, and means automatically controlled by the elevation of the liquid in said tank for stopping the inflow of said associated gases and liquid thereinto, a liquid outlet in the liquid container, and automatic means controlling the liquid outlet operable to automatically close the outlet when the liquid falls below a predetermined level, said automatic inflow stoppage means and said automatic outlet control both being located outside of said tank.

6. In apparatus for separating casinghead gases or vapors from liquid oil, a tank constituting a liquid container and a gas expansion chamber, an inlet leading directly into said expansion chamber at a point intermediate the top and bottom portions of said tank to permit the joint inflow directly into said expansion chamber of associated gases and liquid, and the gases to expand and rise, and the liquid to settle therefrom and fall, a valve associated with said inlet and automatically closed when the liquid rises in the tank to a predetermined level and automatically opened when the liquid falls below said level, a liquid outlet in the lower portion of said liquid container, a valve associated with said outlet and automatically closed when the liquid falls below a predetermined different level and opened when the liquid rises above said last mentioned level, an inlet pipe for said inlet, an outlet pipe for said outlet, said valves both located outside said tank, a by-pass connecting said inlet pipe and said outlet pipe outside of said tank, and an automatic valve for said by-pass automatically opened to permit gases and liquid to pass through the by-pass when the said inlet valve is closed, and automatically closed to close the by-pass when the inlet valve is open.

In witness whereof, I hereunto subscribe my name to this specification in the presence of two witnesses.

THOMAS K. SMITH.

Witnesses:
H. H. GANNARD,
E. J. BOWMASTER.